United States Patent [19]

Lagain et al.

[11] Patent Number: 5,422,188
[45] Date of Patent: Jun. 6, 1995

[54] PART MADE FROM CERAMIC COMPOSITE HAVING A METALLIC COATING, PROCESS FOR PRODUCING SAME AND POWDER COMPOSITION USED

[75] Inventors: Georges L. Lagain, Combs La Ville; Bernard P. C. Sohier, Savigny Le Temple; Danilo Varela, Sevres, all of France

[73] Assignee: Societe Nationale d'Etude et de Construction de Moteurs d'Aviation "S.N.E.C.M.A.", Paris, France

[21] Appl. No.: 877,134

[22] Filed: May 1, 1992

[30] Foreign Application Priority Data

May 3, 1991 [FR] France ................ 91 05446

[51] Int. Cl.⁶ .................................................. B22F 7/02
[52] U.S. Cl. .................................... 428/549; 428/550; 428/552; 428/553; 428/559; 428/566; 428/567
[58] Field of Search ............... 428/539.5, 548, 549, 428/550, 551, 552, 553, 554, 555, 556, 559, 565, 566, 567, 568

[56] References Cited

U.S. PATENT DOCUMENTS

| | | | |
|---|---|---|---|
| 2,798,577 | 7/1957 | LaForge, Jr. | 189/36.5 |
| 2,996,401 | 8/1961 | Welch et al. | 117/22 |
| 3,023,492 | 3/1962 | Bristow | 29/195 |
| 3,114,961 | 12/1963 | Chambers et al. | 29/156.8 |
| 3,235,346 | 2/1966 | Hucke | 29/190 |
| 3,410,714 | 11/1968 | Jones | 117/46 |
| 3,446,643 | 5/1969 | Karlak | 117/22 |
| 3,608,170 | 9/1971 | Larson et al. | 29/149.5 M |
| 3,649,406 | 3/1972 | McNish | 156/245 |
| 3,672,849 | 6/1972 | Bredzs et al. | 29/195 |
| 3,705,791 | 12/1972 | Bredzs | 29/195 |
| 3,864,154 | 2/1975 | Gazza et al. | 29/123 B |
| 3,957,454 | 5/1976 | Bessen | 29/194 |
| 4,040,159 | 8/1977 | Darrow et al. | 29/156.8 H |
| 4,404,262 | 9/1983 | Watmough | 428/539.5 |
| 4,411,960 | 10/1983 | Mizuhara | 428/610 |
| 4,591,480 | 5/1986 | Morishita et al. | 419/9 |
| 4,956,137 | 9/1990 | Dwivedi | 264/60 |
| 4,957,561 | 9/1990 | Esashi | 106/286.3 |
| 5,266,414 | 11/1993 | Goeser et al. | 428/545 |

FOREIGN PATENT DOCUMENTS

| | | |
|---|---|---|
| 0396146 | 11/1990 | European Pat. Off. |
| 1229098 | 9/1960 | France |
| 1500503 | 11/1967 | France |
| 2026268 | 9/1970 | France |
| 2329402 | 5/1977 | France |

OTHER PUBLICATIONS

Chemical Abstracts, vol. 111, No. 6, 18 Sep. 1989, abrege No. 101871a, Columbus, Ohio, US; & JP-A-137482 (Niippo Steel Corp.) Aug. 2, 1989.

*Aberge* Method for Metalizing Ceramics Patent Abstracts of Japan, File Supplier JAPS; & JP-A-1290725 (Komatsu Ltd) Nov. 22, 1989.

*Abstract* Production of Wear-Resistant Composite Material.

Primary Examiner—Donald P. Walsh
Assistant Examiner—Chrisman D. Carroll
Attorney, Agent, or Firm—Oblon, Spivak, McClelland, Maier & Neustadt

[57] ABSTRACT

A metallic coating on a part made from a ceramic composite is obtained from a powder obtained by mixing two powders: namely, a base powder A comprising 2 to 5% of a reactive element Ti or Zr, at least one melting element B or Si in proportions ensuring a liquidus temperature between 1000° C. and 1300° C. and additional metallic elements including at least 50% Ni or Ni+Co;

a powder B in a weight ratio of 5 to 30%, the elements of which are chosen to impart to the part particularly desired surface properties such as anti-wear, anti-oxidation and/or anti-corrosion, and to ensure a liquidus temperature of powder B greater than that of powder A.

8 Claims, 1 Drawing Sheet

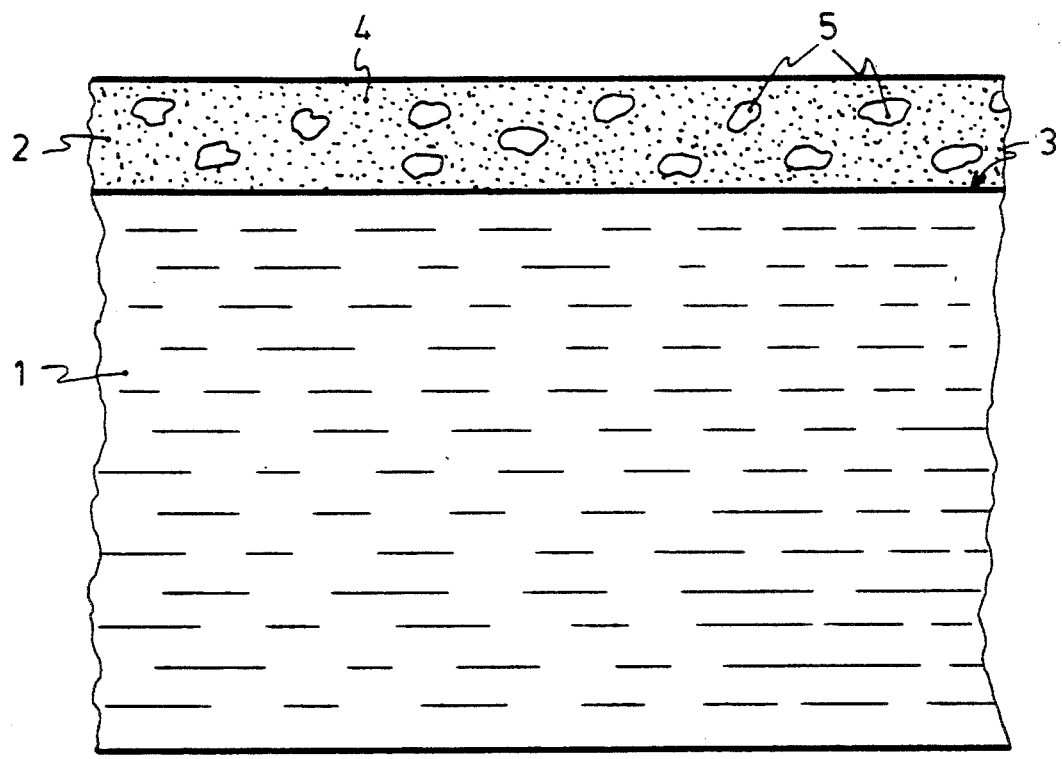
FIG:1
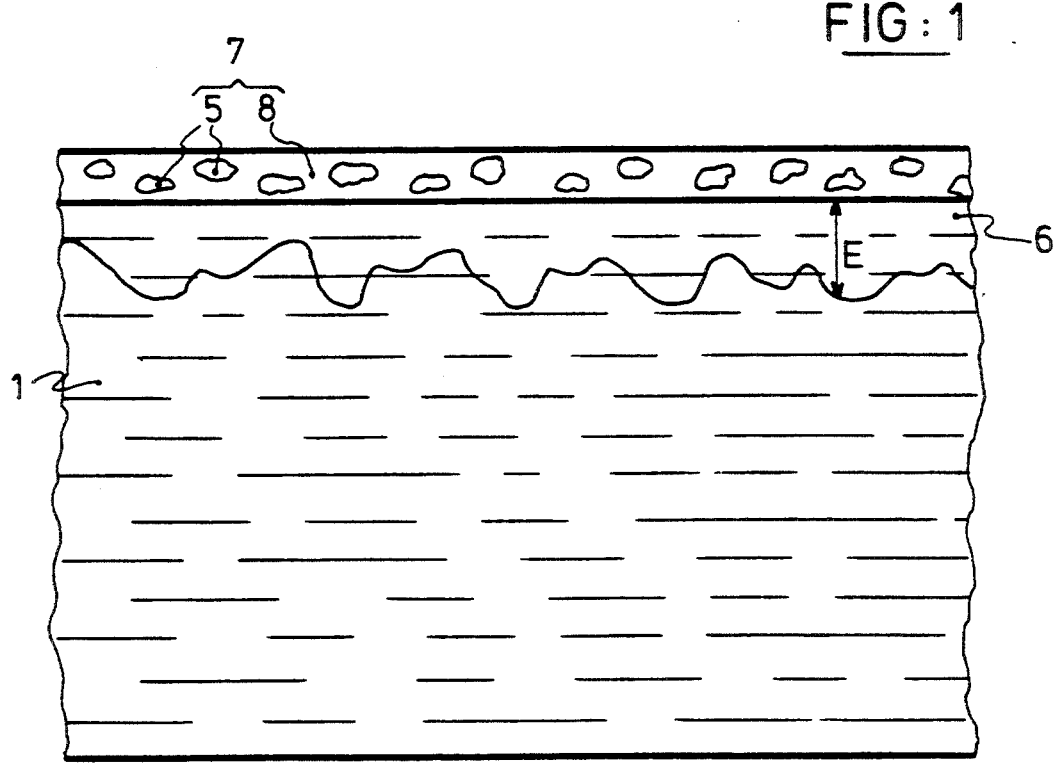
FIG:2

PART MADE FROM CERAMIC COMPOSITE HAVING A METALLIC COATING, PROCESS FOR PRODUCING SAME AND POWDER COMPOSITION USED

FIELD OF THE INVENTION

The present invention relates to a process for producing a metallic coating on a part made from a composite material having a ceramic matrix. The invention also relates to the part thus obtained having a noteworthy surface structure, as well as to the composition of the metallic alloy powder used in producing the coating.

BACKGROUND OF THE INVENTION

Composite materials, particularly those of fibrous type having a ceramic matrix, have recognised qualities, particularly their resistance to high temperatures and the gain in mass they bring about. However, in some applications, their use is restricted because of certain defects in their surface characteristics. There is an evident need to improve these characteristics, particularly in regard to the resistance of the materials to wear due to friction or erosion, their resistance to oxidation or corrosion, or to improve their surface condition, particularly their surface roughness. In certain applications, these deficiencies become apparent, bringing about decohesion of the fibres, particularly at the edges of the parts.

Some tentative solutions have been proposed, such as deposition by flame spraying or arc plasma. However, the adoption of these techniques often meets with difficulties due to inadequate adhesion of the resulting depositions. The keying quality obtained is inadequate, and the stresses caused by differential expansion lead to fibre decohesion.

Various coating processes, particularly in the case where resistance to erosion and corrosion of parts subjected to high temperatures is sought, have also been envisaged in FR-A-2 329 402, particularly the application of a protective coating to a substrate formed by a multi-layer metallic mesh brazed on the core of the part.

SUMMARY OF THE INVENTION

According to the invention, there is provided a part made from composite material having a ceramic matrix and comprising a metallic coating, wherein the surface structure of the part comprises a first binding layer impregnating a thickness E of the ceramic composite material, which is obtained by infiltration of a high temperature liquid phase, and comprises at least one element which reacts with the ceramic material and is selected from the group titanium and zirconium, and a second external layer being continuous with the first layer and comprising in addition grains of specific elements selected in dependence on the particular surface property sought.

Preferably, a metallic alloy powder used to produce the metallic coating on the part is formed from a mixture of at least two powders a base powder A comprising from 2 to 5% by weight of an element selected from the group titanium and zirconium which reacts with the ceramic material, at least one melting element selected from the group boron and silicon in such proportions that the liquidus temperature of said powder A is in the range from 1000° to 1300° C., and complementary metallic elements of which at least 50% by weight is nickel or the sum of nickel and cobalt;

a filler powder B in the proportion by weight in the range from 5 to 30% and comprising elements selected in such a way that the liquidus temperature of powder B is greater than that of the base powder A and that the particular surface properties such as anti-wear, anti-corrosion, anti-oxidation are obtained.

Advantageously, said metallic coating is produced according to a process which comprises the following steps:

a) mixing at least two metallic alloy powders using a known organic binder to obtain a paste, said powders A and B being in accordance with the description given above;

b) cleaning the surface of the part to be coated;

c) depositing said paste prepared by step a);

d) furnace heating, either in vacuo, or in a controlled atmosphere, to a temperature which is at least equal to the liquidus temperature of powder A and is less than the liquidus temperature of powder B, followed by holding this temperature constant for a short period of less than 15 minutes, and then cooling.

The invention will now be described in more detail with reference to an embodiment, given by way of example only, with reference to the accompanying drawings.

BRIEF DESCRIPTION OF THE DRAWINGS

FIG. 1 is a partial sectional view, before heating, taken in a plane normal to the surface of a part on which a coating has been deposited, and FIG. 2 is the same sectional view after heating.

DETAILED DESCRIPTION OF THE INVENTION

The invention applies to parts 1 made from composite materials having a ceramic matrix. In an application of the invention, a protective metallic coating was provided on a flap forming a movable part of a turbojet nozzle, the flap being made from composite material consisting of SiC fibres in a SiC matrix. To this end, a paste 2 is obtained by mixing two metal alloy powders using a known organic binder:

a base powder A, of nominal composition in percentages by weight:

Ni 53, Cr 14, Cu 20, Si 8, Ti 5 a filler powder B of nominal composition in percentages by weight, as follows:

Cr 25, Ni 11, W 8 and Co to 100.

The proportion of powder B is in the ratio of 25% by weight.

The grain sizes of the powders used are as follows:

for powder A, between 40 and 50 μm, for powder B, between 50 and 150 μm.

After cleaning the surface of the part 1 shown in FIG. 1, the aforementioned paste 2 is applied to the surface 3 of the part.

FIG. 1 shows the structure before the part is heated:

the relatively coarse grains 5 come from the filler powder B: in the illustrated example, the choice of the composition of powder B results from a search for anti-wear properties of the coating to be obtained.

finer grains 4 come from the base powder A.

Whatever the application envisaged, the particular surface properties sought are obtained by the choice of the alloy used in powder B and in particular, the presence of Co gives anti-wear properties, and the presence of Cr and Al gives oxidation-resistant properties.

The base powder A, defined hereinabove, has a liquidus temperature of 1150° C. In all cases, at least one melting element such as boron or silicon is present in the powder A to ensure that a liquid phase is produced when the mixture is heated to a temperature in the range from 1000° C. to 1300° C. Powder A also includes elements such as titanium and/or zirconium to ensure that the presence of these reactive elements in said liquid phase give rise a metallurgical reaction with the ceramic material. The amount of these reactive elements may vary from 2 to 5% by weight of the powder A. The choice of the respective compositions of powders A and B is also such that the liquidus temperature of powder B is higher than that of powder A. The filler powder B may vary from 5 to 30%, by weight, depending on the particular application.

Part 1 coated with the paste 2 is then heated in a furnace, and then cooled. In the present application, heating is carried out in a furnace under vacuum, and a level temperature is maintained for ten minutes at 1230° C. Depending on the application, a controlled atmosphere may be produced in the furnace. In all cases, a temperature at least equal to the liquidus temperature of powder A must be attained, but this temperature must stay below the liquidus temperature of powder B. In all cases, the maximum temperature must be maintained for a short period. This period will be less than 15 minutes.

The aim of this requirement is to reduce diffusion and/or dissolution phenomena which might occur in the case of prolonged heating, on the one hand, between the obtained liquid phase and the ceramic material of part 1, and, on the other hand, between said liquid phase and the alloy elements in the filler powder B. These diffusion and dissolution phenomena, which are particularly undesirable because they cause brittleness, are also avoided by selecting the grain sizes of powders A and B: coarser grains 5 for powder B, and finer grains for powder A, as described hereinabove.

The result obtained after part 1 has been heated in the furnace is represented diagrammatically in FIG. 2. At high temperature, infiltration of the liquid phase into the fibrous structure of the material of part 1 occurs by capillary action. Impregnation by the deposition results in a mechanical keying effect corresponding to a binding layer 6 of thickness E in the surface structure obtained which results from fusion of grains 4 from powder A.

Bearing in mind particularly the limited period for which the high temperature is maintained, there remains in the external layer 7 covering the surface of the part 1, a structure 8 formed from t-he fusion of the grains 4 providing continuity with the coating 6 while remaining combined with the grains 5 from powder B.

In addition, the metallic deposition provides an additional metallurgical keying effect. Indeed, because of the presence of the reactive elements Ti or Zr in the high temperature liquid phase, infiltrating the fibrous structure of the composite material of part 1, and coming from powder A, wetting occurs and a metallurgical reaction of the metallic liquid phase with the ceramic material of part 1 occurs in the binding layer 6.

Results, which are satisfactory in every respect, have thus been obtained in the particular application described above where the thickness of the outer layer 7 is 0.3 mm, and a depth of impregnation corresponding to the thickness E of the binding layer 6 is in the range from 0.5 to 1 mm.

We claim:

1. A composite material having a ceramic matrix and comprising a metallic coating, wherein its surface structure comprises a first binding layer impregnating a thickness of the ceramic composite material, which is obtained by infiltration of a high temperature liquid phase, and comprises at least one element which reacts with the ceramic material and is selected from the group consisting of titanium and zirconium, and a second external layer continuous over said first layer comprising titanium or zirconium, and, in addition, grains of elements having grain size of 50 to 150 μm of a mixture of Co, Ni, Cr and W, or of a mixture of Cr and Al.

2. The composite material according to claim 1, wherein said high temperature liquid phase comprises a mixture of at least two powders:

a base powder A comprising from 2 to 5% by weight of an element selected from the group consisting of titanium and zirconium which reacts with the ceramic material, at least one melting element selected from the group consisting of boron and silicon in such proportions such that the liquidus temperature of said powder A is in the range from 1000° to 1300° C., and complementary metallic elements of which at least 50% by weight is nickel or the sum of nickel and cobalt; and a filler powder B in the proportion by weight in the range from 5 to 30% and comprising elements selected in such a way that the liquidus temperature of the powder B is greater than that of the base powder A and being a mixture of Co, Ni, Cr and W, or a mixture of Cr and Al.

3. The composite material according to claim 2 wherein the base powder A has the following nominal composition expressed in percentages by weight:

Ni 53; Cr 14; Cu 20; Si 8; Ti 5 and has a liquidus temperature of 1,115° C., and the filler powder B is in the proportion by weight of 25% and has the following nominal composition expressed as percentages by weight:

Cr 25; Ni 11; W 8 and Co to 100, the grain sizes of the powders being in the range from 40 to 50 μm for powder A, and from 50 to 150 μm for powder B.

4. The composite material according to claim 1 having a structure comprised of SiC fibers in a ceramic matrix of a SiC base.

5. The composite material according to claim 3, having a structure comprised of SiC fibers in a ceramic matrix of a SiC base.

6. The composite material according to claim 1, prepared by the steps of:

a) mixing at least two metallic alloy powders with an organic binder to obtain a paste, wherein said metallic alloy powders comprise:

a base powder A comprising from 2 to 5% by weight of an element selected from the group consisting of titanium and zirconium which reacts with the ceramic material, at least one melting element selected from the group consisting of boron and silicon in such proportions such that the liquidus temperature of said powder A is in the range from 1000° to 1300° C., and complementary metallic elements of which at least 50% by weight is nickel or the sum of nickel and cobalt; and a filler powder B in the proportion by weight in the range from 5 to 30% and comprising elements selected in such a way that the liquidus temperature of the powder B is greater than that of the base powder A and being a mixture of Co, Ni, Cr and W, or a mixture of Cr and Al;

b) cleaning the surface of the part to be coated;
c) depositing said paste prepared by step a);
d) furnace heating, either in vacuo, or in a controlled atmosphere, to a temperature which is at least equal to the liquidus temperature of powder A and is less than the liquidus temperature of powder B, followed by holding this temperature constant for a short period, less than 15 minutes, and then cooling.

7. The composite material according to claim 1, wherein said grains comprise cobalt, imparting anti-wear properties.

8. The composite material according to claim 1, wherein the grains are of Cr and Al, imparting oxidation resistant properties.

* * * * *

UNITED STATES PATENT AND TRADEMARK OFFICE
CERTIFICATE OF CORRECTION

PATENT NO. : 5,422,188

DATED : June 6, 1995

INVENTOR(S) : Georges L. Lagain et al

It is certified that error appears in the above-identified patent and that said Letters Patent is hereby corrected as shown below:

Column 3, line 56, "t-he" should read --the--.

Signed and Sealed this

Thirteenth Day of August, 1996

Attest:

BRUCE LEHMAN

Attesting Officer

Commissioner of Patents and Trademarks